United States Patent [19]
Twardowska et al.

[11] Patent Number: 5,837,047
[45] Date of Patent: Nov. 17, 1998

[54] HEAT CURABLE BINDER SYSTEMS AND THEIR USE

[75] Inventors: Helena Twardowska; John J. Cooper, both of Columbus, Ohio

[73] Assignee: Ashland Inc., Columbus, Ohio

[21] Appl. No.: 763,666

[22] Filed: Dec. 11, 1996

[51] Int. Cl.[6] ....................................... B28B 7/28
[52] U.S. Cl. ..................... 106/38.3; 106/38.35; 106/600; 106/603; 501/80; 264/333; 164/98
[58] Field of Search ................................ 106/38.3, 38.35, 106/600, 603; 501/80; 264/332, 333; 164/98

[56] References Cited

U.S. PATENT DOCUMENTS

| | | | |
|---|---|---|---|
| 3,804,641 | 4/1974 | Lyass et al. | 106/38.2 |
| 4,190,698 | 2/1980 | DeBoel et al. | 423/334 |
| 4,196,011 | 4/1980 | Koike | 106/38.2 |
| 4,530,722 | 7/1985 | Moore et al. | 106/38.3 |
| 4,812,424 | 3/1989 | Helferich et al. | 501/84 |
| 4,923,832 | 5/1990 | Newkirk et al. | 501/128 |
| 5,298,339 | 3/1994 | Aghajanian et al. | 428/614 |
| 5,417,751 | 5/1995 | Twardowska et al. | 106/38.3 |
| 5,433,261 | 7/1995 | Hinton et al. | 164/98 |
| 5,500,244 | 3/1996 | Rocazella et al. | 427/181 |

FOREIGN PATENT DOCUMENTS

| | | |
|---|---|---|
| 57-357196719 | 12/1982 | Japan . |
| 59-359030716 | 2/1984 | Japan . |
| 60-360195018 | 10/1985 | Japan . |
| 401061748 | 3/1989 | Japan . |
| 403112808 | 5/1991 | Japan . |
| 404036207 | 2/1992 | Japan . |
| WO 94/14725 | 7/1994 | WIPO . |

OTHER PUBLICATIONS

Properties and Microstructures of Lanxide® $Al_2O_3$ –Al Ceramic Composite Materials, M.K. Aghajanian, et al, Lanxide Corporation, Journal of Materials Science 24 (1989) (No Month Available).

*Primary Examiner*—Paul Marcantoni
*Attorney, Agent, or Firm*—David L. Hedden

[57] ABSTRACT

This invention relates to heat cured binder systems comprising as separate Parts: Part I comprising (a) a soluble source of silica, (b) an alcohol, and preferably (c) a surfactant; and Part II comprising an alkali aluminate. The binder systems are mixed with a refractory to form a refractory mix. The resulting refractory mix is shaped and heated at an elevated temperature to form a cured refractory shape, particularly a preform. Heat is applied by warm air, baking in an oven, microwave, or preferably by hot-box equipment.

14 Claims, No Drawings

# HEAT CURABLE BINDER SYSTEMS AND THEIR USE

FIELD OF THE INVENTION

This invention relates to heat curable binder systems comprising as separate parts: a Part I comprising (a) a soluble source of silica, (b) an alcohol, and preferably (c) a surfactant; and a Part II comprising an alkali aluminate. The binder components are mixed with an aggregate to form a mix. The resulting mix is shaped and heated at an elevated temperature to form a cured shape, particularly ceramic preforms. Heat is applied by warm air, baking in an oven, microwave, or preferably by hot-box equipment.

BACKGROUND OF THE INVENTION

Several patents describe methods for making metal matrix composite bodies by spontaneously infiltrating porous ceramic filler materials. U.S. Pat. Nos. 5,500,244, 5,298,339, 4,923,832 and 5,433,261 focus on infiltration techniques, promoters, control of atmosphere during infiltration, etc. Very little development is devoted to making ceramic preforms and binders used for this process. U.S. Pat. Nos. 5,433,261 and WO 9,414,725 describe liquid organo-metallic ceramic precursor for making rigidized ceramic preforms. This binder has many disadvantages, such as slow cure rate, low hot and cold strength and high cost. U.S. Pat. No. 5,500,244 discloses the use of colloidal oxides, e.g. colloidal alumina or silica, to rigidize ceramic fillers. The process involves freezing of colloidal oxide/filler mix and then heating to about 900° C. before contacting with molten matrix metal. This is not a high production process. There is a possibility of complete closure of interconnected porosity during sintering which would inhibit infiltration.

SUMMARY OF THE INVENTION

The subject invention relates to heat curable binder systems comprising as separate parts:

A. a Part I comprising:
(a) soluble source of silica,
(b) an alcohol, and preferably
(c) a surfactant; and
B. a Part II comprising:
an alkali aluminate.

The binder system is mixed with an aggregate to form a mix. The resulting mix is shaped and cured by heating in one continuous stage with warm air, baking in oven, microwave, and preferably in hot-box equipment.

Curing of the binder system does not occur spontaneously when the Parts are mixed with an aggregate and shaped, but instead occurs when the shaped mix is heated to temperatures of at least 150° C. to 300° C., preferably 200° C. to 275° C., most preferably 230° C. to 260° C.

$C^{13}$ NMR studies suggest that alcohol is not only a solvent, but is reacted with the other binder components. Shaping mixes prepared with the subject binder systems do not substantially react until heated and have a benchlife of at least five hours.

Shapes prepared with the binder systems show improved immediate strength, strength development over twenty-four hours, humidity resistance, and scratch hardness when compared to binder systems which do not contain an alcohol. The polyhydric alcohols are especially useful for making cores and molds with various sands as aggregates. Some polyhydric alcohols, such as sorbitol control the rate of dehydration under hot box conditions and prevent excessive drying of shapes during storage at ambient conditions.

The binder system with aliphatic alcohols is particularly useful for making porous ceramic preforms suitable for the production of metal matrix composites. These preforms can be made economically with high productivity in an environmentally acceptable way and have good hot and cold strength. Ceramic preforms rigidized with the binder can be spontaneously infiltrated with molten aluminum to form ceramic/metal composites. Infiltration promoters, such as magnesium metal powder and magnesium oxide, can be added to preforms. Evidence related to the microstructure of the composite preforms suggests that alumina particles are embedded into aluminum matrix and there is no porosity at aluminum/alumina interface.

ENABLING DISCLOSURE AND BEST MODE

For purposes of describing the invention herein the following definitions will be used:

Aggregate—any material which can be used to make foundry shapes or refractory shapes.
Mix—a mixture of aggregate and binder system used for making shapes.
Mold or Core—any disposable shape which is use to create empty space in the object to be made.
Pattern—a disposable shape which has the shape of the object made.
Preform—a pattern which is infiltrated with a metal and is the object made for use.
Shape—any shape used in the molding or extrusion industry including foundry shapes or refractory shapes, particularly molds, cores, patterns, and preforms.

The binder system consists of two parts: a Part I comprising (a) a soluble source of silica, (b) an alcohol, and preferably (c) a surfactant; and a Part II comprising an alkali aluminate. Either Part may be liquid or solid, but at least one Part must be liquid. If either Part is a solid Part, the solid Part will dissolve in the liquid Part when the two Parts are mixed.

The amount of solids in the Part I typically ranges from 40–50 weight percent. The amount of solids in the Part II typically ranges from 35–45 weight percent. The weight percent is based upon the total weight of the Part I and Part II respectively. The alkali aluminate is a powder alkali aluminate, or an alkali aluminate in solution, preferably where sodium aluminate is the alkali aluminate. The powder form provides greater flexibility to the formulator when adding other Parts to the binder, but liquid Parts are easier to use.

Although various combinations of soluble silica source and alkali aluminate are possible, the best results are obtained when a colloidal silica solution is used with solid or liquid sodium aluminate.

For purposes of describing this invention, term alcohol means monofunctional alcohols, glycols, and polyhydric alcohols. The alcohols used in the binder systems are added to the source of silica, typically a colloidal silica solution. Although a variety of alcohols can be used, for example xylitol, erythritol, glycerin, ethylene glycol, aliphatic alcohols, the best results are obtained with sorbitol, ethanol, isopropanol and butanol. The optimum alcohol concentration, particularly sorbitol, is from about 0.05% to about 0.40% bos, preferably 0.15% to about 0.25% bos.

The binder system will typically contain 10–35 weight percent colloidal silica, 1–20 weight percent alcohol, 60–80 weight percent sodium aluminate solution having solids concentration at 35–45 weight percent, 0–1 weight percent surfactant where said weight percent is based upon the total weight of the binder system. The preferred ranges are 15–30 weight percent colloidal silica, 2–10 weight percent alcohol, 65–75 weight percent sodium aluminate solution and 0–0.5 weight percent surfactant. This would correspond to a molar ratio of $Na_2O:Al_2O_3$ from 1:1 to 1.4:1 and $SiO_2:Al_2O_3$ from 1:1 to 1.7:1, preferably $Na_2O:Al_2O_3$ from 1:1 to 1.3:1 and $SiO_2:Al_2O_3$ from 1:1 to 1.5:1.

Other additives, such as surfactants, can be added to silica solution to improve flowability of the sand mix. Preferably used for this purpose is sodium dodecylbenzene sulfonate, WITCONATE 45 of Witco.

The binder system composition is mixed with an aggregate at a binder level of 1–15 percent based on filler (BOF), preferably 2–8 percent, to form a shaping mixture, and cured in conventional hot box equipment. Preferably the Part I is first applied to the aggregate when making a mix. Then the Part II is added.

Hot box, warm air/warm box, baking in conventional oven and microwave can be used to cure the mixture of binder system and aggregate. The alcohols incorporate into the structure of the binder at elevated temperature, resulting in improved film properties. The binder exhibits high immediate strength and good strength development over 24 hrs. The shapes have good scratch hardness and good humidity resistance with silica, lake sands and various alumina grades. The polyhydric alcohols control the rate of dehydration under hot box conditions and prevent excessive drying on the surface of cores, resulting in improved scratch hardness.

The aggregate can be any conventional aggregate used in the foundry industry or any refractory used in making shapes from refractory materials. Sand, typically sand which contains at least 70 percent by weight silica, is used as the aggregate. Other suitable aggregate materials include zircon, olivine, alumino-silicate sand, chromite sand, and the like. Sand used for die casting preferably has a fineness grade of 70 to 105. For making preforms, the preferred aggregate is a ceramic refractory, particularly alumina, silicon carbide, silicon nitride, and used at a binder level of 4–8 weight percent.

The curing of the shapes is accomplished by the crystallization and dehydration of the reaction product of the silica and sodium aluminate at elevated temperature. The curing time depends on the temperature and the equipment used. With conventional hot box equipment, the temperature range typically used is 175°–300° C. which results in cure times of 30–90 seconds.

The following abbreviations are used in the Examples and Tables which follow:
bos=based on sand
bof=based on filler
BP=blow pressure (psi)
CH=constant humidity
CT=constant temperature
DT=dwell time (seconds)
Imm.=immediate (strength out of box)
PI=Part I (source of silica)
PII=Part II (source of alumina)
RH=room humidity
RT=room temperature Example A is a control which does not employ an alcohol. Examples 1–2 show formulations containing various amounts of sorbitol which are used in making preforms with alumina refractory.

EXAMPLE A and 1

A mixture containing tabular alumina refractory and binder were formulated by first mixing the Part I with the alumina and then mixing the Part II using a paddle mixer Hobart N-50. Both the Part I and Part II were liquid. The mix was made in the shape of dog bones and cured in a conventional hot box system. The curing conditions were as follows:

blow time/pressure 0.5 sec at 65 psi box temperature 230° C.

dwell time 90 sec

The tensile strength of preforms was measured with a Thwing-Albert TA 500. The humidity resistance was tested by placing samples which have cured for 24 hrs into a humidity chamber at 25 C. and 99% RH. The tensile strength was measured after 1 hr exposure and is designated as 24+1 hrs. Tabular alumina 60 mesh was used in Examples A, 1, 2 and 100 mesh tabular alumina with fines removed was used in the remaining examples.

In Example A, no sorbitol was added while Examples 1–2 contained varying amounts of sorbitol. The test conditions and the amount of binder components are described below:

TEST CONDITIONS

Refractory: Alumina (4000 parts)

$CT^1$ Room: 50% Relative Humidity, 25° C.

CT=constant temperature/humidity room, used to store cores that were tested after 5 minutes.

| | BINDER FORMULATION | | |
|---|---|---|---|
| Example | A | 1 | 2 |
| Part I | | | |
| Ludox TM-50 | 2.0% | 2.0% | 2.0% |
| Sorbitol | none | 0.15% | 0.25% |
| Witconate 45 | 0.01% | 0.01% | 0.01% |
| Part II | | | |
| Sodium Aluminate | 4.5% | 4.5% | 4.5% |

TABLE I

TENSILE PROPERTIES AND SCRATCH HARDNESS

| | TENSILE STRENGTH (psi) zero benchlife | | Scratch |
|---|---|---|---|
| Example | 24 hrs. | 24hrs. + 1 | Hardness |
| A | 103 | 54 | 60 |
| 1 | 112 | 106 | 87 |
| 2 | 163 | 152 | 86 |

The results in Table I indicate that tensile strengths of the shapes measured 24 hours after curing and 24 hours after curing and aging under high humidity for one hour are improved by the addition of the sorbitol. Scratch hardness is also improved. Observation of the shapes also shows that friability is improved.

EXAMPLES 3–5

Example 1 was followed except the Part I/Part II ratio was varied. The amount of sorbitol was at 0.25% bof and the amount of surfactant Witconate 45 was 0.01% bof. The results are shown in Table II.

TABLE II

TENSILE PROPERTIES AND SCRATCH HARDNESS

| Example | Part I/Part II ratio | Tensiles (psi) | | | | Scratch Hardness |
|---|---|---|---|---|---|---|
| | | Imm. | 1 hr. | 24 hrs. | 24 hrs. + 1 | |
| 3 | 0.0/6.5 | 0 | 0 | 0 | 0 | 0 |
| 4 | 1.0/5.5 | 22 | 242 | 126 | 70 | 79 |
| 5 | 1.5/5.0 | 43 | 299 | 186 | 121 | 80 |

EXAMPLE 6–9

The procedure in Example 1 was used to prepare alumina preforms but aliphatic alcohols were added to Part I of the binder.

The results are shown in Table III. They indicate that the addition of alcohols, such as ethanol, isopropanol, n-butanol, increase strength, density and scratch hardness of alumina preforms. The flowability is also significantly improved, resulting in increased density and better surface finish of preforms.

TABLE III

TENSILE PROPERTIES AND SCRATCH HARDNESS

| Example | Alcohol | Tensiles (psi) | | | | Scratch Hardness |
|---|---|---|---|---|---|---|
| | | Imm. | 1 hr. | 24 hrs. | 24 hrs. + 1 | |
| 6 | none | 35 | 225 | 203 | 149 | 60 |
| 7 | ethanol | 64 | 306 | 272 | 168 | 72 |
| 8 | isopropanol | 75 | 313 | 301 | 226 | 70 |
| 9 | n-butanol | 67 | 332 | 302 | 201 | 75 |

EXAMPLE 10–13

The procedure in Example 1 was used, but some water based colloidal silica solution was replaced with colloidal silica solution in isopropanol. This is a commercial product of Nissan Chemicals with trade name IPA-ST. It contains 30% of colloidal silica. These formulations show the best mixing properties with alumina and the best flowability. The strength results are summarized in Table IV.

TABLE IV

TENSILE PROPERTIES AND SCRATCH HARDNESS

| Example | Ludox/IPA-ST % bof | TENSILES (PSI) (zero benchlife) | | | | Scratch Hardness |
|---|---|---|---|---|---|---|
| | | Imm. | 1 hr. | 24 hrs. | 24 hrs + 1 | |
| 10 | 2.0/0 | 35 | 225 | 203 | 149 | 60 |
| 11 | 1.5/0.83 | 65 | 278 | 267 | 207 | 68 |
| 12 | 1.0/1.65 | 61 | 276 | 252 | 196 | 66 |
| 13 | 0/3.3 | 65 | 188 | 204 | 146 | 67 |

EXAMPLE 13

The procedure of Example 1 was used (formulation 2) to prepare preforms except 2 weight percent of magnesium powder was added to alumina to facilitate infiltration with molten aluminum. The dog bone shaped preforms were successfully infiltrated with aluminum at 880° C. The composite materials were completely infiltrated, with no residual porosity, as shown by Scanning Electron Microscopy data. They had excellent mechanical and thermal properties and very good surface finish.

EXAMPLES 14–15

Example 1 was followed except New Jersey silica sand (grain finess 80 ) was used instead of alumina. The binder composition was as follows:

Part I: 1.5% colloidal silica Ludox TM 50 + sorbitol, see below
Part II: 4.0% sodium aluminate.

Solid additives such as aluminum silicate, were added to those formulations to accelerate strength development. Core making conditions were:

hot box temperature 230° C.
dwell time 50 sec.

The results are summarized in Table V.

TABLE V

TENSILE PROPERTIES AND SCRATCH HARDNESS

| Example | % Sorbitol | Tensiles (psi) | | | | Scratch Hardness |
|---|---|---|---|---|---|---|
| | | Imm. | 1 hr. | 24 hrs. | 24 hrs. + 1 | |
| 14 | 0 | 20 | 140 | 112 | 53 | 50 |
| 15 | 0.25 | 32 | 212 | 135 | 129 | 65 |
| 16 | 0.35 | 29 | 162 | 147 | 93 | 66 |

Table V shows that the addition of sorbitol improves sand performance of the cores made with the binder, especially the strength after 24 and 24+1 hrs. Also the scratch hardness of cores is significantly improved. The optimum sorbitol concentration is about 0.25% bos.

We claim:

1. A heat-curable mix comprising in admixture:
    (a) an aggregate;
    (b) a heat-curable water-soluble binder comprising:
        (1) colloidal silica,
        (2) an alcohol in the amount of 1.0 weight percent to 10 weight percent based upon the weight of the binder, and
        (3) an alkali aluminate.

2. The mix of claim 1 wherein the source of alkali aluminate in said binder is solid or liquid sodium aluminate and the alcohol is sorbitol.

3. The mix of claim 2 wherein a surfactant is also present.

4. The mix of claim 3 wherein the weight percent of components in said binder is from 10–35 weight percent colloidal silica, 1–20 weight percent alcohol, 60–80 weight percent sodium aluminate solution having solids concentration at 35–45 weight percent, 0–5 weight percent surfactant where said weight percent is based upon the total weight of the binder system.

5. The mix of claim 4 wherein the weight ratio components of said binder is from 15–30 weight percent colloidal silica, 2–10 weight percent alcohol, 65–75 weight percent sodium aluminate solution and 0–0.5 weight percent surfactant.

6. The mix of claim 4 wherein the molar ratio of $Na_2O:Al_2O_3$ in said binder is from 1:1 to 1.4:1 and the molar ratio of $SiO_2:Al_2O_3$ in said binder is from 1:1 to 1.7:1.

7. A process for preparing a workable shape comprising:
    (a) forming a mix as specified in claim 1 or 5;
    (b) shaping the mix;

(c) contacting the shape of (b) with a source of heat at a temperature of 150° C. to 300° C.; and (d) allowing the shape to harden into a workable refractory shape.

8. The process of claim 7 where the aggregate is a ceramic refractory.

9. The process of claim 7 wherein the shape is a pattern.

10. The process of claim 9 where the pattern is infiltrated with a metal.

11. The process of claim 10, where the aggregate is alumina.

12. A preform prepared in accordance with claim 11.

13. A process for preparing a preform comprising:

(a) fabricating a shape in accordance with claim 9;

(b) pouring molten metal into and around said shape; and (c) allowing said metal to cool and solidify.

14. An infiltrated pattern prepared in accordance with claim 10.

* * * * *